United States Patent [19]

Kohut

[11] Patent Number: 5,445,434
[45] Date of Patent: Aug. 29, 1995

[54] HEAD RESTRAINT MOUNTING ARRANGEMENT

[75] Inventor: Thomas P. Kohut, Bloomfield Hills, Mich.

[73] Assignee: General Motors Corporation, Detroit, Mich.

[21] Appl. No.: 172,360

[22] Filed: Dec. 23, 1993

[51] Int. Cl.$^6$ .............................................. A47C 7/38
[52] U.S. Cl. .................................. 297/391; 297/440.1
[58] Field of Search ............... 297/391, 410, 397, 404, 297/440.1

[56] References Cited

U.S. PATENT DOCUMENTS

| | | | |
|---|---|---|---|
| 3,544,162 | 12/1970 | Uchiyamada et al. | 297/410 |
| 4,411,470 | 10/1983 | Nishimura et al. | 297/410 |
| 4,427,233 | 1/1984 | Matumoto | 297/391 |
| 4,568,123 | 2/1986 | Yasui et al. | 297/410 |
| 4,589,698 | 5/1986 | Suzuki | 297/410 |
| 4,604,777 | 8/1986 | Meeks | 24/665 |
| 4,639,041 | 1/1987 | Furukawa | 297/391 |
| 4,657,297 | 4/1987 | Ishibashi | 296/63 |
| 4,657,425 | 4/1987 | Takahashi | 403/104 |
| 4,695,095 | 9/1987 | Faust et al. | 297/410 |
| 4,844,545 | 7/1989 | Ishii | 297/410 |
| 4,976,493 | 12/1990 | Frankila | 297/410 |
| 5,080,437 | 1/1992 | Pesta et al. | 297/410 |
| 5,156,440 | 10/1992 | Vidwans | 297/410 |
| 5,228,183 | 7/1993 | Saeki | 29/527.3 |

Primary Examiner—Kenneth J. Dorner
Assistant Examiner—Milton Nelson, Jr.
Attorney, Agent, or Firm—Ernest E. Helms

[57] ABSTRACT

An arrangement for releasably mounting a head restraint to a vehicle seat back is provided which, in a preferred embodiment, includes a post connected with the head restraint, the post having at least one notch; a guide having an aperture for receiving the post, the guide having at least one compliant finger for interlocking in the notch of the post upon a predetermined angular positioning of the guide, the guide also having a head on its end generally opposite the head restraint and also having a projection; and a tube fixably connected with the seat back for mounting the guide, the tube having a slot for capturing the guide projection and permitting the guide to rotate between a position allowing removal of the post and a position wherein the post is interlocked by the finger of the guide being within the notch and additionally the tube having a surface for interaction with the head of the guide, preventing removal of the guide from the tube after insertion of the guide into the tube.

1 Claim, 3 Drawing Sheets

HEAD RESTRAINT MOUNTING ARRANGEMENT

FIELD OF THE INVENTION

The field of the present invention is that of mounting arrangements for vehicle head restraints. More particularly, the field of the present invention is that of head restraint arrangements wherein the head restraint can be attached to a vehicle seat back without the use of tooling and can also be removed from the seat back without any use of tooling.

BACKGROUND OF THE INVENTION

There are currently many arrangements which allow a head restraint to be attached with the seat back of a vehicle seat. However, most mounting arrangements for head restraints require either that the surrounding cushion material be removed or that specialized tooling be used to remove the head restraint from the seat back. It is desirable to mount a head restraint to a seat back which requires no tools for installation and which allows the head restraint to be removed from the vehicle without removing the seat cover which covers the seat back or which requires the use of tooling. Additionally, it is desirable to provide a head restraint mounting arrangement which does not rely upon a spring-type clutch mechanism to hold the head restraint within the seat back.

SUMMARY OF THE INVENTION

To meet the above-noted desires, the present invention is brought forth. The present invention provides a tube connected to the frame of the seat back. In a preferred embodiment, the tube has an L-shaped groove having vertical and horizontal legs. Fitting into the tube in a rotatable fashion is a compliant guide which has at its bottom end inwardly extending fingers. The guide has an aperture for receipt of a post connected to the head restraint. The post of the head restraint has on its end opposing notches. Rotation of the guide allows the fingers of the guide to interlock with the notches of the post, thus affixing the head restraint to the back rest of the vehicle. Turning of the guide allows the fingers of the guide to release from the notches in the post, thus allowing the removal of the head restraint from the seat back of the vehicle.

Other advantages of the present invention will become apparent to those skilled in the art after review of the accompanying drawings and detailed description thereof.

DESCRIPTION OF THE PREFERRED EMBODIMENTS

Figure 1:
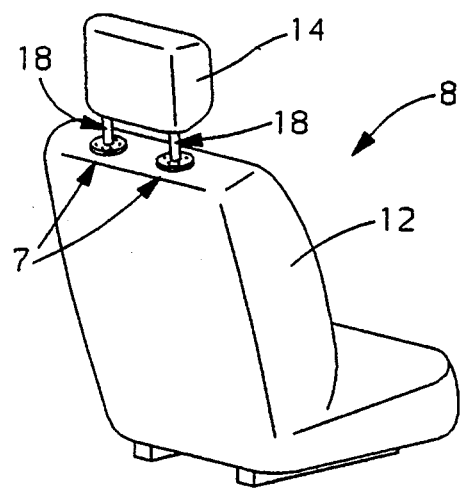
FIG. 1 is a perspective w a vehicle seat utilizing a preferred embodiment of the present invention.
Figure 2:
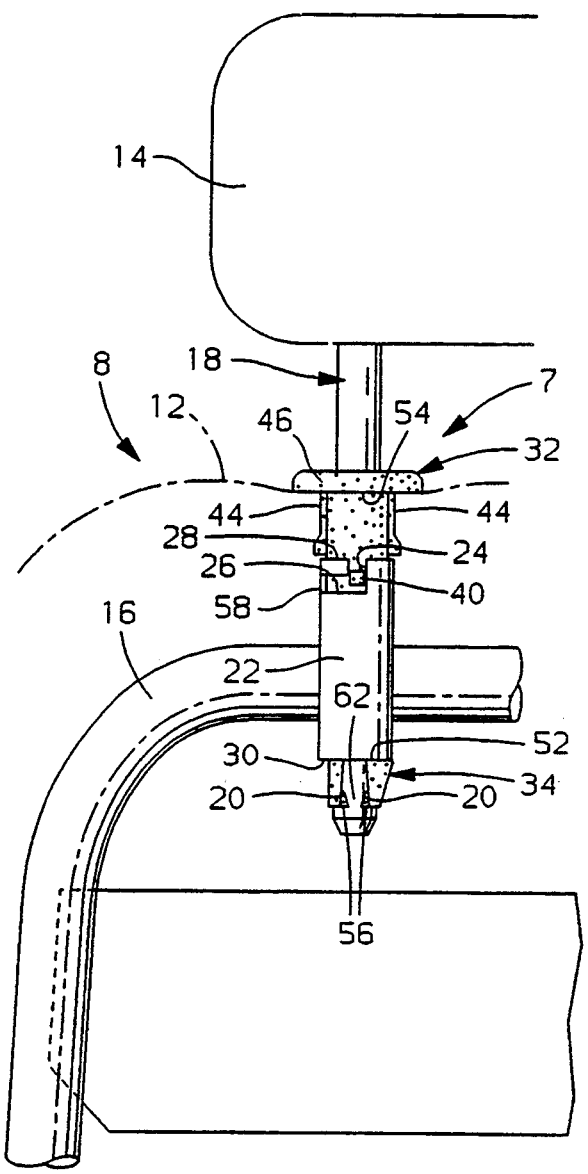
FIG. 2 is a front elevational view of the present invention illustrating the attachment of the head restraint with the vehicle seat back.

Referring to FIG. 1, a vehicle seat 8 having a seat back 12 and a head restraint 14 (sometimes referred to as a head rest) of the present invention is illustrated. Referring additionally to FIGS. 2 through 6, the vehicle seat back 12 has a U-shaped frame member 16. A head restraint mounting arrangement 7 connects the head restraint 14 to the seat back frame 16. The first component of the head rest mounting arrangement 7 is a post 18 which is connected to the head restraint 14. As shown, there are two posts 18, and the arrangement 7 may be used for both posts 18 according to the desire of the designer. However, the present invention can also be utilized on just one post 18.

The post 18 has on its end most adjacent to the seat back frame 16 two opposing notches 20. Joined by welding or other suitable arrangement to the seat back frame 16 are tubes 22 (only one shown). Typically, the tube 22 will be a metallic member. The tube has an L-shaped groove with a vertical leg 24 and a horizontal leg 26. The tube is typically circular in cross section and has an upper edge 28 and a lower edge 30.

Inserted within the post is a guide 32. The guide has a head 34, and the guide is typically manufactured from a compliant polymeric material such as acetal plastic. The guide also has a main body 36, a slot 38, a projection 40 and a stop member 44. The guide is topped by a collar 46 and has extending therethrough for reception of the post an aperture or bore 50. The collar 46 is provided to allow manual rotation of the guide and to cover an access hole (not shown) in the seat back 12 trim cover.

The operation of the present invention is as follows. The guide 32 is inserted within the tube 22, the tube 22 being previously joined to the frame 16 of the seat back. To allow for the bending necessary to get the head 34 inside the tube 22, the guide 32 is provided with a slot 38 to allow an inward bending. The guide 32 typically will have thin outward vertical ribs on its main body 32 (not shown) to ease the insertion process. Insertion will occur with projection 40 being vertically aligned with the vertical groove 24 of the tube. After the guide 32 is fully inserted within the tube 22, the head will resiliently push to restore itself to the free state, bringing the top 52 of the head 34 into a permanently locking arrangement with edge 30 of the tube. Henceforth, removal of the guide 32 from the tube 22 will not occur unless the head 34 is deliberately pushed inwardly. A stop 44 will limit the insertion of the guide 22 into the tube. A bottom surface 54 of the collar will rest upon the seat cover (see FIG. 1 and phantom line in FIGS. 2 and 4) which covers the padding (not shown) laid over the seat back frame 16.

The head restraint post 18 is then inserted within the guide 32. Upon reaching its proper installation position, the post 18 will cause opposing fingers of the guide to interlock within the notch 20, thereby causing the guide to interlock with the post 18, provided the guide 18 is in its proper predetermined angular position within the tube 22 (projection 40 in the vertical leg 24). This interlock will be permanent. The foam padding (not shown) of the seat back 12 pushes up on the post 18, placing the top 52 of the head 34 into contact with edge 30 of the tube. The above, by design, will place projection 40 in a position vertically higher than the horizontal groove leg 26 at a point approximating the midpoint of vertical leg 24.

Figure 3:
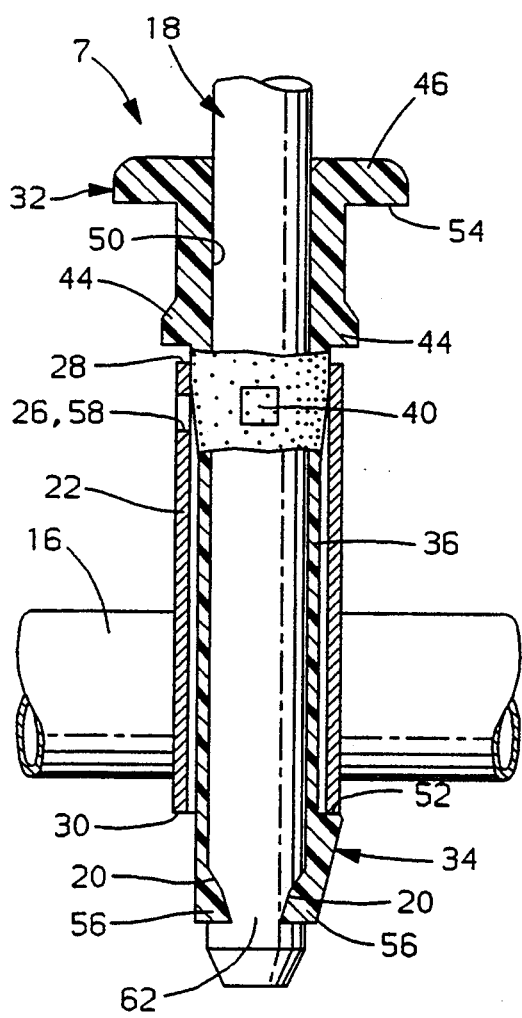
FIG. 3 is an enlargement of a portion of FIG. 2 with some parts shown in section.
Figure 4:
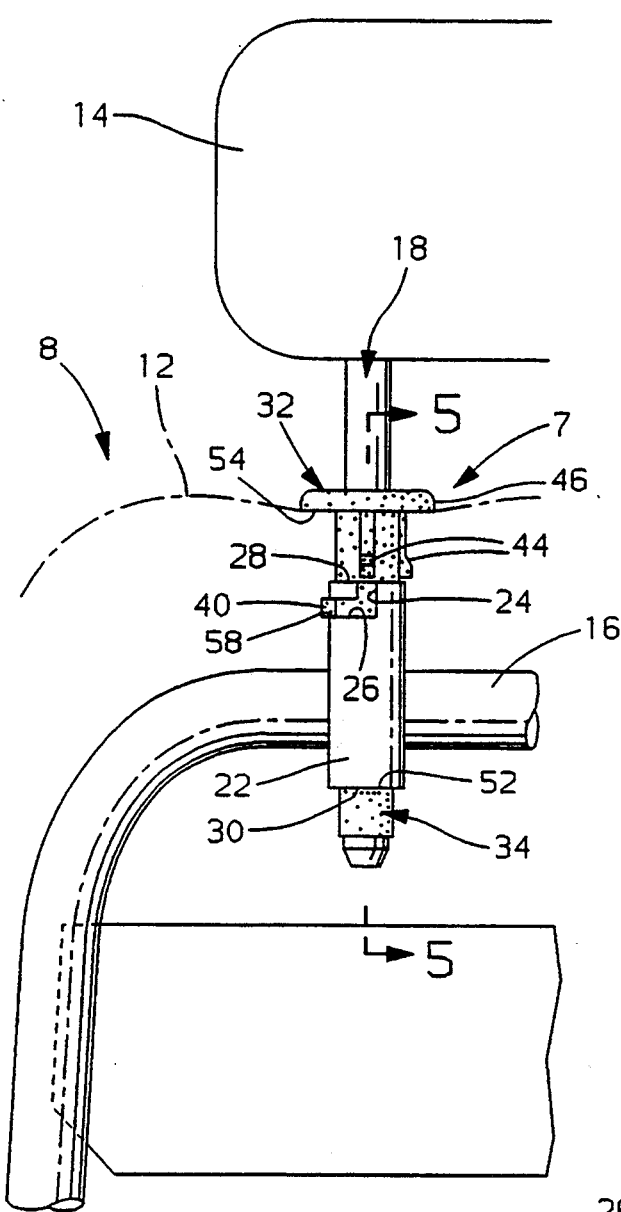
FIG. 4 is a view similar to that of FIG. 2 illustrating operation of the present invention when it is desirable to remove the head restraint from the seat back.
Figure 5:
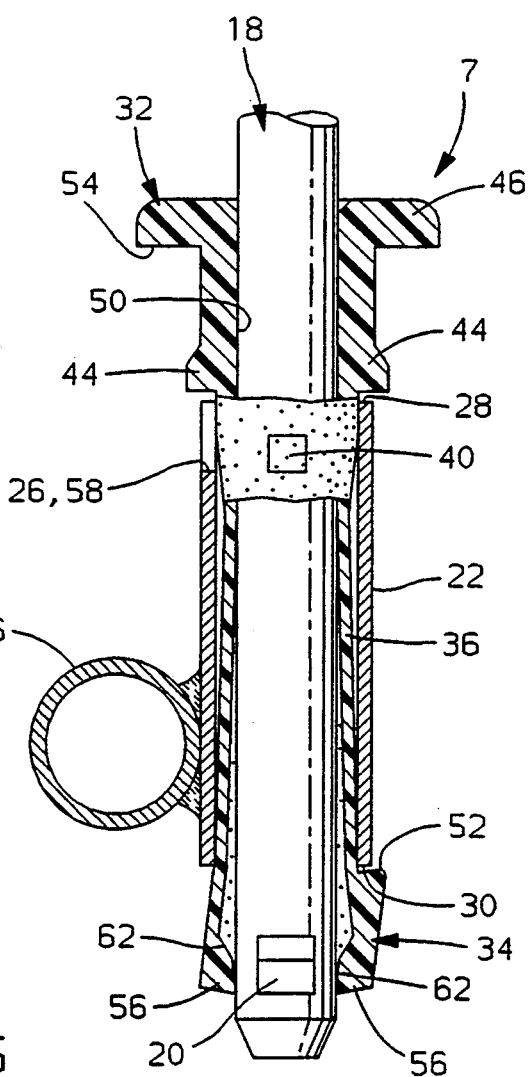
FIG. 5 is a view taken along line 5—5 of FIG. 4.
Figure 6:
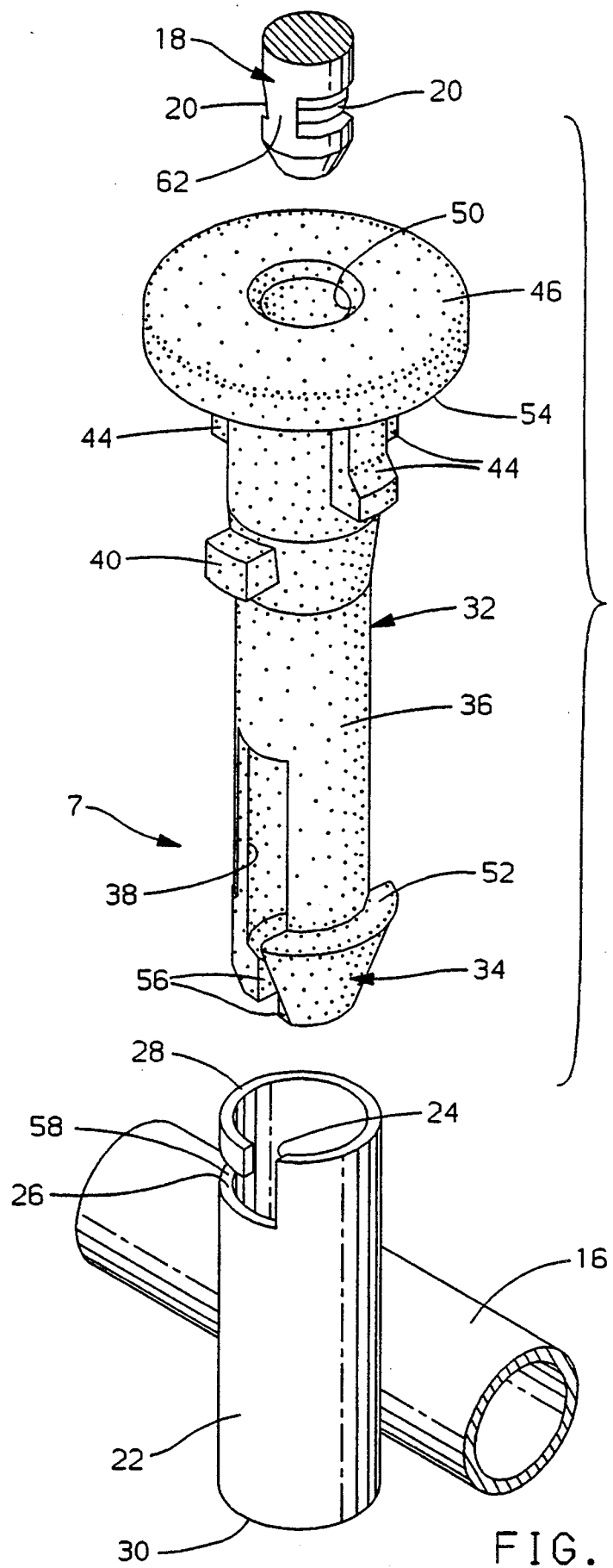
FIG. 6 is an exploded view of the main components of the present invention.

To remove the post 18 from the seat back 12, the guide 32 is pushed downward until projection 40 bottoms out in vertical leg groove 24. The guide 32 is then rotated leftwardly as shown in FIG. 3, causing the projection 40 to travel to an extreme end 58 of the horizontal groove 26. If desired, the guide 28 can be configured to have the stop 44 limit further downward movement when the projection 40 is in the horizontal leg 26. The above downward and leftward action causes the finger 56 to ride up on a smooth portion 62 of the post, thereby allowing the post 18 and its connected head rest 14 to be removed.

In an embodiment not shown, it is apparent to those skilled in the art that a radially extending projection or projections could be placed upon the post with a corresponding aperture for receipt thereof in the guide member having the remainder of the aperture being generally circular. The interlocking of the guide and the post could occur upon rotation of the guide, placing the circular portion of its aperture above the projection of the post. However, the above arrangement has been found to be less desirable. It is also apparent to those skilled in the art that the post can have a plurality of notches vertically aligned, allowing this arrangement to be utilized on different vehicles while using the same guide and allowing different attachment heights for different head restraint designs.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. An arrangement for releasably mounting a head restraint to a vehicle seat back comprising:

a post connected with a head restraint, the post having at least one notch;

a guide having an aperture for receiving the post, the guide having at least one compliant finger for interlocking in the notch of the post upon a predetermined angular positioning of the guide, the guide also having a head on its end generally opposite the head restraint and also having a projection; and a tube fixably connected with a seat back for mounting the guide, the tube having an L-shaped groove with a horizontal leg for capturing the guide projection, and the tube permitting the guide to be simply rotated between a position allowing removal of the post and a position wherein the post is interlocked by the finger of the guide being within the notch, and additionally the tube having a surface for interaction with the head of the guide, preventing removal of the guide from the tube after insertion of the guide into the tube.

* * * * *